No. 724,660. PATENTED APR. 7, 1903.
J. BENNETT.
APPARATUS FOR COLORING RELIEF OR RAISED ORNAMENTATIONS ON FABRICS.
APPLICATION FILED MAY 20, 1902.
NO MODEL. 5 SHEETS—SHEET 2.
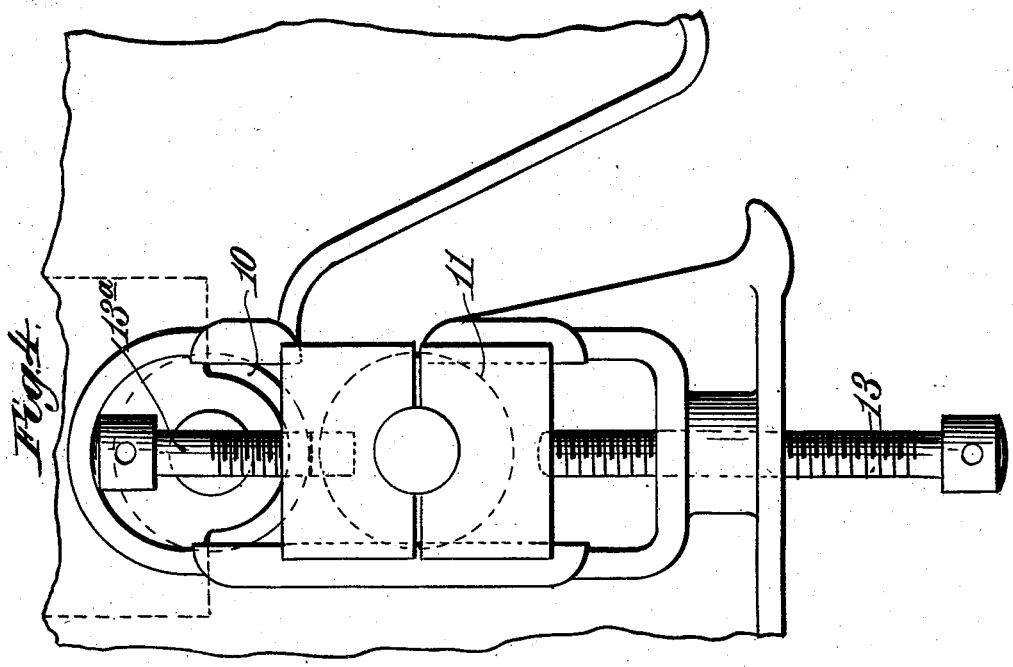
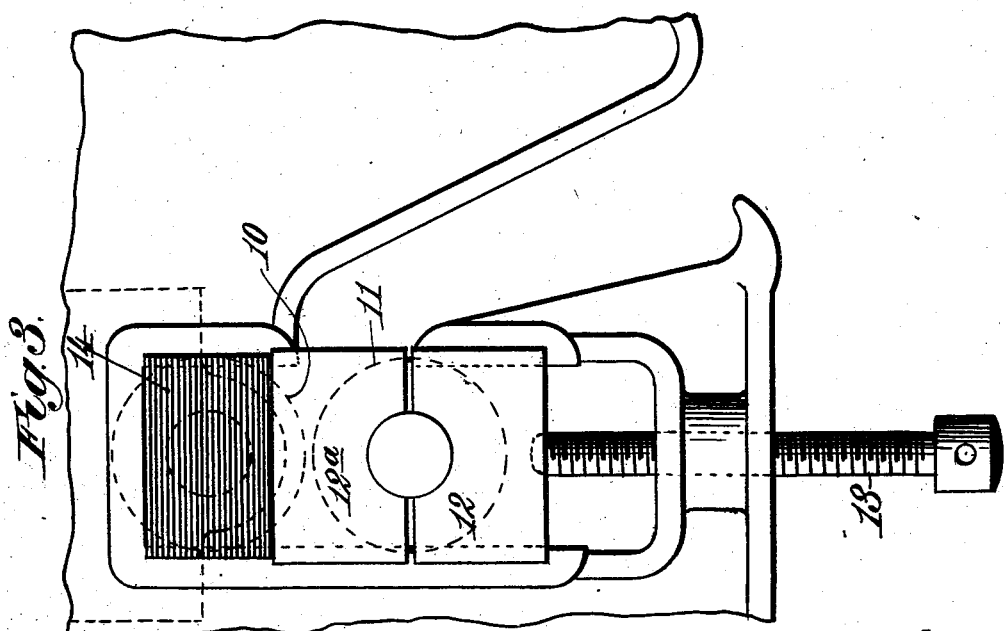
Witnesses.
Inventor
Joseph Bennett.
By James L. Norris.
Atty.

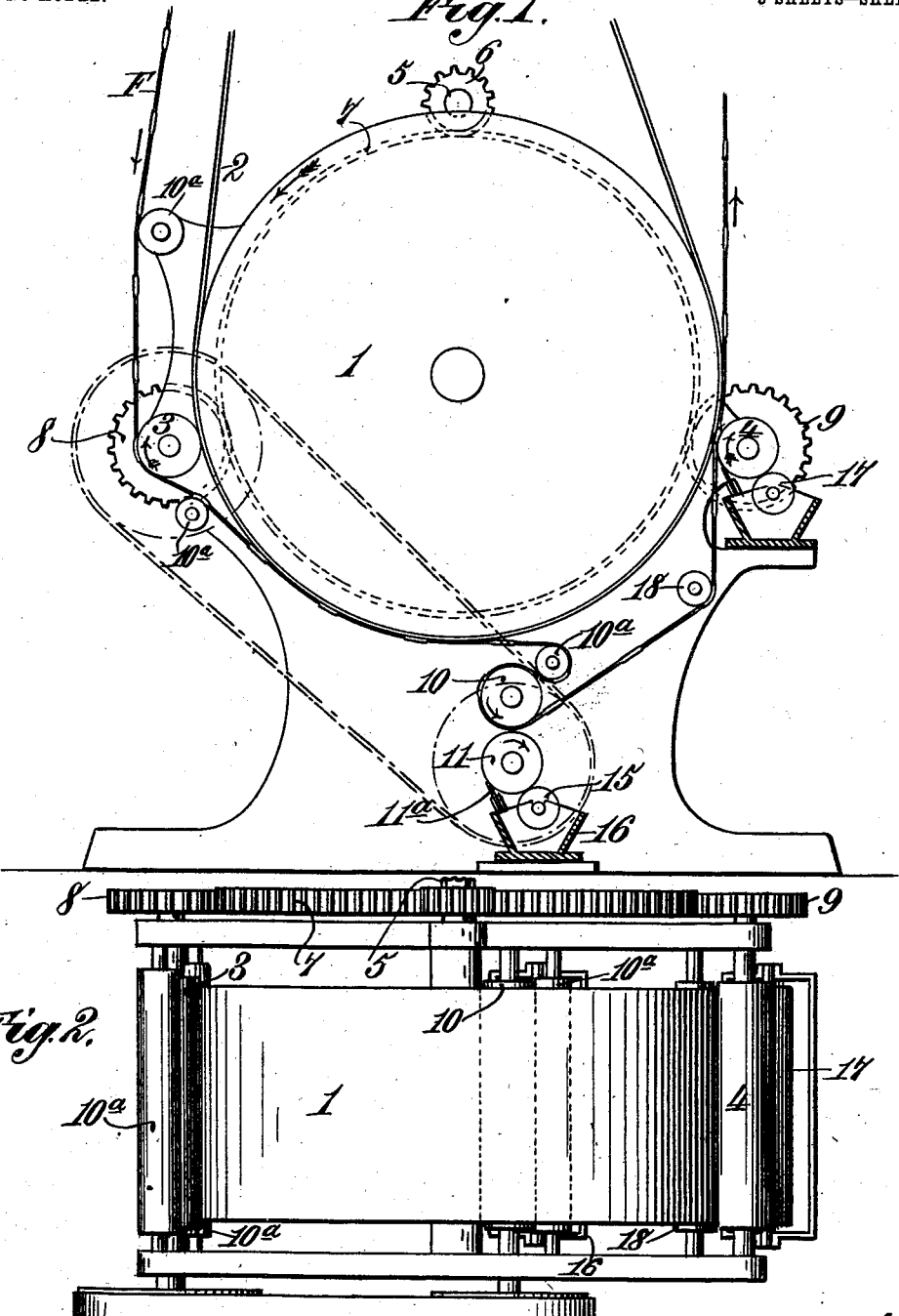

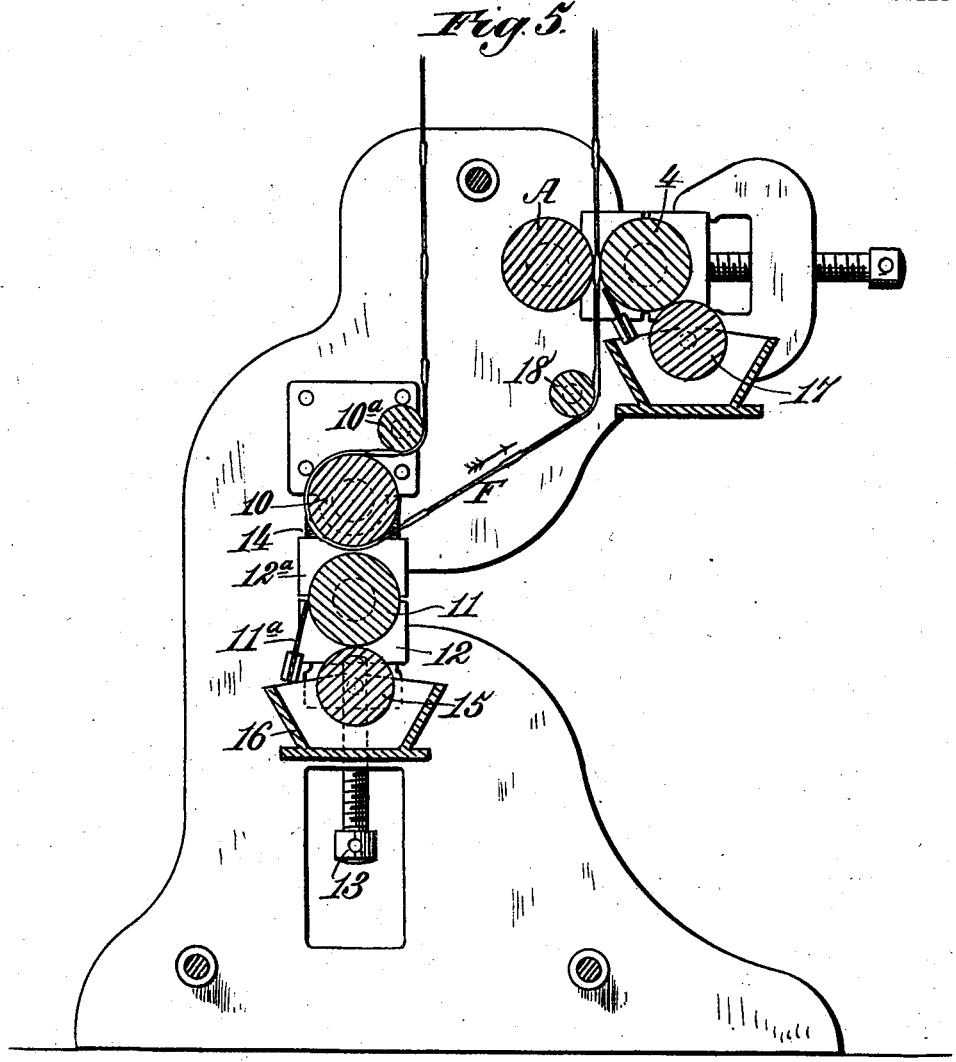

No. 724,660. PATENTED APR. 7, 1903.
J. BENNETT.
APPARATUS FOR COLORING RELIEF OR RAISED ORNAMENTATIONS ON FABRICS.
APPLICATION FILED MAY 20, 1902.
NO MODEL. 5 SHEETS—SHEET 4.
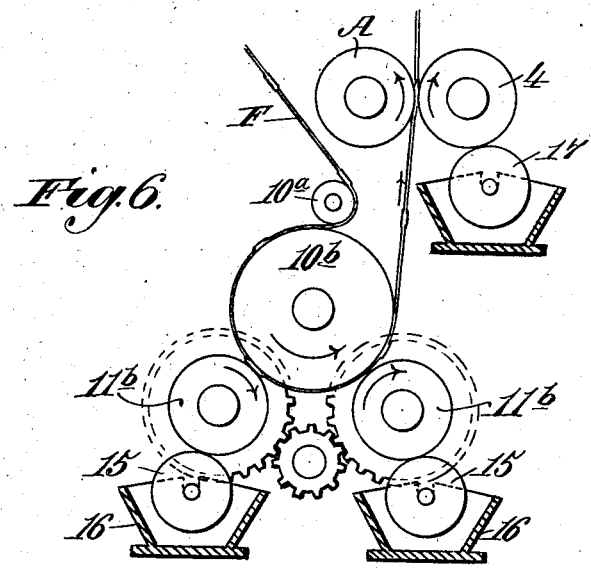
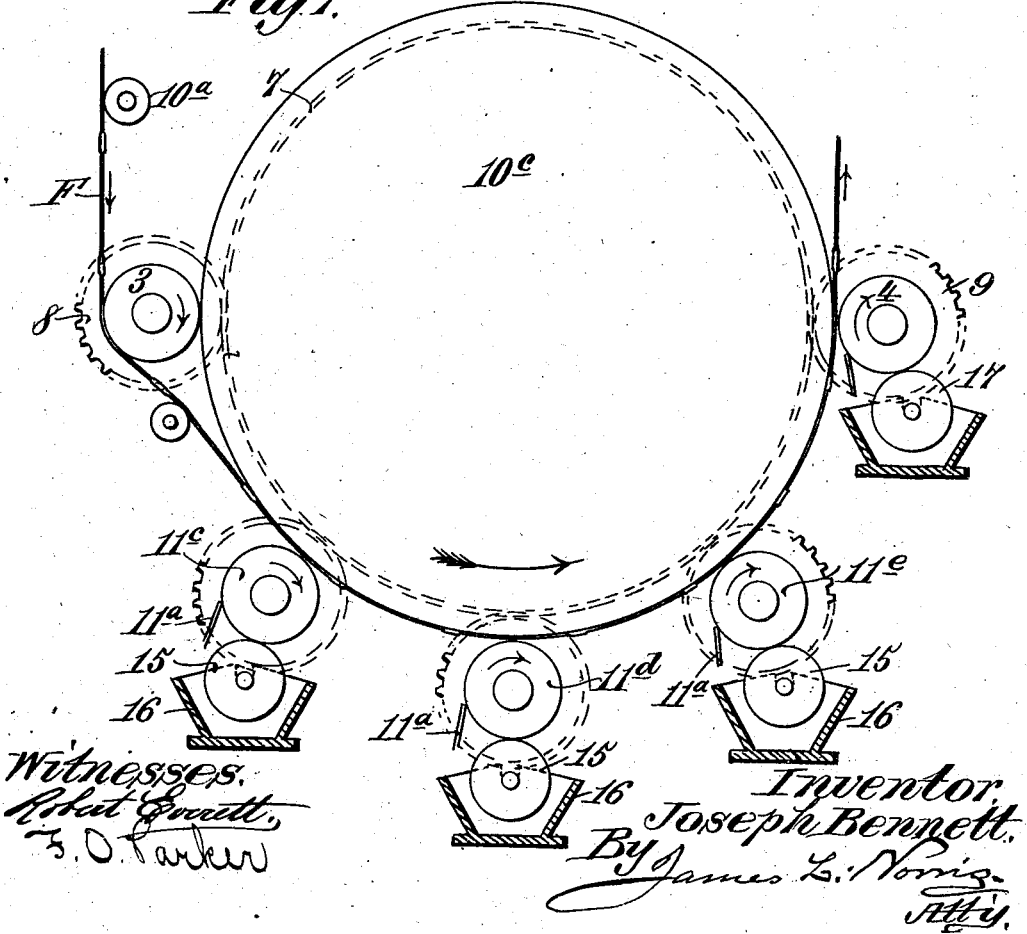
Witnesses.
Inventor
Joseph Bennett.
By James L. Norris.
Atty No. 724,660. PATENTED APR. 7, 1903.
J. BENNETT.
APPARATUS FOR COLORING RELIEF OR RAISED ORNAMENTATIONS ON FABRICS.
APPLICATION FILED MAY 20, 1902.
NO MODEL. 5 SHEETS—SHEET 5.
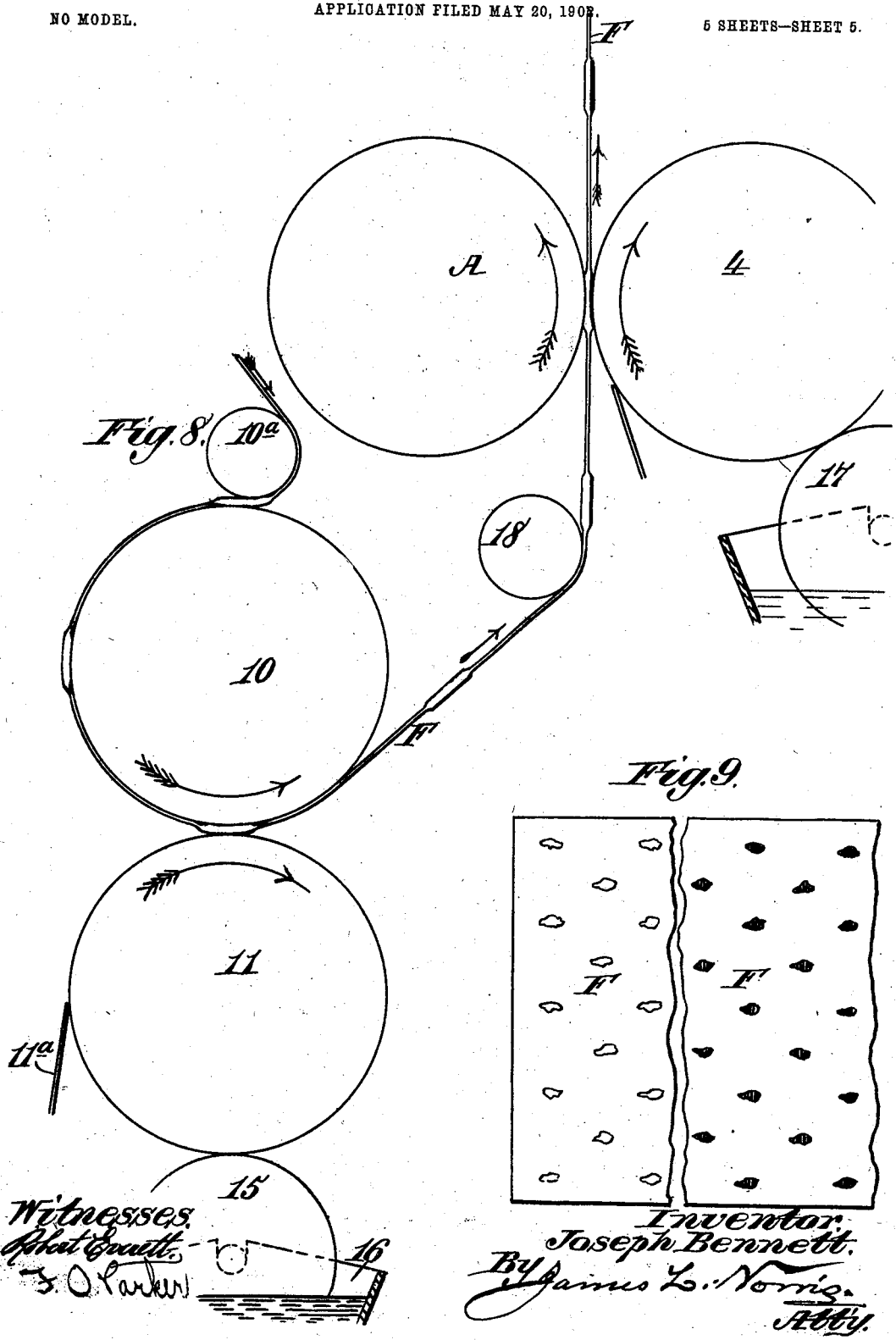

UNITED STATES PATENT OFFICE.

JOSEPH BENNETT, OF NORTH ADAMS, MASSACHUSETTS, ASSIGNOR TO WINDSOR COMPANY, OF NEW YORK, N. Y., AND NORTH ADAMS, MASSACHUSETTS, A CORPORATION OF NEW JERSEY.

APPARATUS FOR COLORING RELIEF OR RAISED ORNAMENTATIONS ON FABRICS.

SPECIFICATION forming part of Letters Patent No. 724,660, dated April 7, 1903.

Application filed May 20, 1902. Serial No. 108,244. (No model.)

*To all whom it may concern:*

Be it known that I, JOSEPH BENNETT, a subject of the King of Great Britain, residing at North Adams, in the county of Berkshire and State of Massachusetts, have invented new and useful Improvements in Apparatus for Coloring Relief or Raised Ornamentations on Fabrics, of which the following is a specification.

My invention relates to apparatus for coloring relief or raised ornamentations on fabric, and has for its object the provision of novel and efficient means which may in themselves constitute a machine or may exist as an attachment to the well-known styles of calico-printing machines and which causes the relief ornamentations only to contact with and take color from a color-roller.

It has long been a desire and endeavor in the art of calico-printing to arrive at efficient and satisfactory means to color relief ornamentations to imitate ornamentations actually woven, embroidered, corded, or otherwise worked in relief upon and in color contrasting with that of the ground fabric; but so far as I am aware no means have prior to my invention been devised to do the work in a satisfactory manner. By my invention, however, I provide an apparatus which accomplishes the result desired in an efficient and commercially satisfactory way.

To the end stated my invention consists in the combination of a fabric-support, a plain-engraved color-roller arranged opposite said fabric-support, and means for adjusting one of said parts relatively to the other and holding it rigidly in the position of adjustment.

In practice the adjustment of the fabric-support and color-roller is such that they are out of contact and the fabric is made to closely hug its support and is held tightly and smoothly against the surface thereof, so that its relief ornamentation stands out boldly or distinctly from the ground or body and such ornament alone contacts with and takes color from the color-roller. The relative position of the fabric-support and color-roller is adjusted so that the passage between them is of the proper width to cause the relief ornamentation to come into contact with and take color from the color-roller, while the ground or body of the fabric, closely hugging the fabric-support, never comes into contact with the color-roller.

My invention involves certain auxiliary arrangements, combinations, and details which will be hereinafter set forth and claimed.

In the accompanying drawings, illustrating my invention in various forms of embodiment, to which, however, my invention is not restricted, the generic features thereof being capable of embodiment in various other forms and arrangements of machines, Figure 1 is a sectional view illustrating my invention as an attachment to a calico-printing machine. Fig. 2 is a top plan view; Fig. 3, a detail of one means by which the relative position of the fabric-support and color-roller may be adjusted. Fig. 4 is a detail of another of such means; Fig. 5, a sectional view of my invention constituting a machine in itself; Fig. 6, a similar view of a multicolor-machine; Fig. 7, a similar view of a different arrangement of multicolor-machine. Fig. 8 is a graphic illustration, on a large scale, of the relative position of the parts of the apparatus and the fabric during the operation of the machine. Fig. 9 is a view showing the fabric before and after being subjected to the machine.

In describing the details of my invention I will first set forth that form in which the invention exists as an attachment to an ordinary calico-printing machine, as illustrated in Figs. 1 and 2 of the drawings. Referring, therefore, to those figures, the reference-numeral 1 designates the usual cylinder of a calico-printing machine journaled in the usual or any suitable manner in the usual or any suitable frame and about which is or may be trained the usual blanket 2. This cylinder may be driven in any suitable manner; but while not restricting myself thereto I illustrate a means for driving the cylinder which, though not material to some of the following clauses of claim, serves also valuable auxiliary functions in dealing with the fabric before and after the relief ornamentation is colored according to this invention, and the elements thereof are therefore made a material feature of some of the claims.

The reference-letter F in all the drawings indicates the fabric.

The illustrated driving means for the bowl consists of two friction-rolls 3 and 4, arranged at opposite sides of the cylinder and in driving contact therewith. The friction-rolls 3 and 4 are in the instance shown positively driven from an engine-shaft 5, preferably in the manner most clearly shown in Fig. 2 of the drawings, by means of the driving-gear 6, transmitting-gear 7, and the pinions 8 and 9, arranged on the shafts of said friction-rolls.

As before stated, in these figures of the drawings my invention is represented as an attachment to a well-known style of calico-printing machine and as here shown consists of a fabric-support in the form of a roll 10 of any suitable material and, if desired, rubber-covered. The roll is journaled in any suitable boxing in the frame of the machine, so that its rotation is caused by the fabric in its closely-hugging travel therearound.

As shown, the fabric F is directed by a series of guide-rolls 10ª to the fabric-support 10, the last of the train of guide-rolls being situated approximately in front of the support 10, so that the fabric is caused to pass almost entirely around the element 10, and is thus caused to closely hug the same, to the end that the fabric is held tightly and smoothly thereagainst under uniform tension and the raised or relief ornamentation thereof caused to stand out clearly and distinctly, the body or ground of the fabric running in a plane behind that of the relief ornamentation, as shown in Fig. 8 of the drawings.

The fabric-support 10 is so arranged as to be directly opposed or opposite to the color-roller 11 and coöperates therewith when the relief ornamentation travels through the passage between them, affording a support for the ornamentation at the rear and causing such ornamentation to stand out distinctly from the ground fabric.

The color-roller 11, which is a "plain-engraved roller" or a "plain-engraved pattern-roller," terms well understood in the calico-printing art, may be furnished with color in any suitable manner. I illustrate in Fig. 1 of the drawings a plain-engraved roller. This roller is arranged in the illustrated example of my invention in a carriage movable on the machine-frame to be adjustable to and from the fabric-support, whereby it is under the control of the operator and is held rigid or immovable in any position of adjustment. This carriage is shown in a desirable but not exclusive form in the accompanying drawings, Fig. 3, wherein it is composed of a two-member boxing 12 12ª, with the member 12 of which an adjusting-screw 13 is connected and the other member, 12ª, of which is acted on by a spring—such, for instance, as a rubber cushion 14, though any suitable spring may be employed, or a suitable auxiliary adjusting-screw 13ª may be utilized in connection with this member of the carriage, as shown in Fig. 4. Other forms of carriage may be adopted within the skill of the mechanic. All that is necessary in respect of the carriage is that it shall carry the color-roller, be adjustable to and from the fabric-support, and hold the color-roller rigidly or immovably in its adjusted position, not permitting it to move nearer to nor farther from said support, maintaining it in a fixed relative position with relation thereto. Such a fixed or immovable position is desirable in the satisfactory performance of the work contemplated by my invention.

The adjusting-screw 13 (and the auxiliary one 13ª when employed) is provided with means to engage an instrument for turning the same to adjust the carriage and the color-roller and is exemplary only, as other means of adjustment, as well as other constructions or forms of roller-carriage, may be adopted without departing from the generic character of the invention.

The color-roller may be driven in any suitable way—as, for example, from the friction-roll 3—by belt and pulley or other suitable gear, and color may be supplied thereto by any suitable feeder—as, for example, by a furnisher 15, rotating in a batch of color contained in a box 16 of usual construction and having the usual adjustable support. A doctor 11ª is utilized to remove the surface color from the color-roller in a manner well known to calico-printers.

The color-roller 11 should be an accurate cylinder and the surface thereof in operation be exactly parallel with and opposite the active surface of the fabric-support 10, which in the roll form shown should also be a true cylinder, and the passage between the two should be just sufficient to accommodate the thickness of the body or ground of the fabric plus the depth of the relief ornamentation thereof, so that the latter will contact with and take color from the color-roller, while the body or ground maintained under tension and in close hugging engagement with the support 10, as shown in Fig. 8, does not come into contact with the color-roller, and hence takes no color therefrom. Thus the relief ornamentation alone is colored, and a fabric results with a relief or raised ornamentation contrasting in color with that of the body or ground thereof and presents a successful replica of relief ornamentation actually woven, embroidered, corded, or otherwise worked in a color contrasting with that of the body or ground of the fabric.

It has been stated that the rolls 3 and 4 subserve functions in addition to that of driving the cylinder. The roll 3 has a surface movement opposite the direction of travel of the fabric and serves to smooth out any wrinkles which may have formed therein and passes the work to the fabric-support in a smooth condition, which presents the outstanding relief ornamentation accurately to the color-roller, from which the color is taken by the ornamentation.

From the passage between the fabric-support and color-roller the fabric in the illustrated example of my invention travels around a guide-roll 18 and in between the friction-roll 4 and the cylinder 1. The roll 4 in this instance serves, with the cylinder, to draw the fabric through the machine and also, as shown in Fig. 7, as a presser-roll to press the color into the threads of the ornamentation, forcing it in, as it were. Any color that this roll may take on its surface may be cleaned off in any suitable way, an example of one way being shown in Fig. 1 of the drawings, in which it is shown rotating in contact with a roller 17, arranged in a body of gum-water solution in a manner well known to those skilled in the calico-printing art.

Referring now to Fig. 5 of the drawings, in which my invention is illustrated as an organized machine rather than an attachment, the cylinder 1 and its blanket are absent, as are also the guide-rolls $10^a$, (though these or other guiding devices may be employed.) A pressure-roll A takes the place of the cylinder 1 to coöperate with the friction-roll 4 to pull the fabric through the machine and press or force the color into the threads of the ornamentation. This machine may be driven from an engine-shaft by means of gearing, such as shown in said figure, the fabric support or roller being rotated by the fabric.

In Fig. 6 of the drawings the invention is shown embodied in one form of multicolor-machine. The arrangement in this machine is the same as in the machine of Fig. 5, except that two color-rollers $11^b$ $11^b$ and suitable appurtenant color-furnishers are employed in coöperation with a fabric-support $10^b$ of sufficient surface to coöperate with the two color-rollers. The machine shown in this figure may be driven like the machine of Fig. 5, intermediate gearing being suitably added to drive two color-rollers instead of one.

Fig. 7 of the drawings illustrates a different form of multicolor-machine, which will be found desirable when a number of color-rollers are used. I have illustrated three such rollers $11^c$ $11^d$ $11^e$ coöperating with an enlarged fabric-support $10^c$, which may consist of the usual cylinder of a printing-machine. Around this support may be arranged any convenient number of the adjustable color-rollers. This machine may be driven in the manner in which that shown in Fig. 1 of the drawings is driven, the several color-rollers gearing with the transmitting-gear 7 or in any suitable manner.

In the various forms of machine shown, as well as others in which it may be embodied, any suitable tension devices, such as the usual tension devices of a calico-printing machine, may be availed of. These tension devices being well known to calico-printers are not shown in the drawings.

Having learned the object, construction or arrangement, and mode of operation of my invention, as herein described, the skilled calico-printer will be enabled to adjust the relative positions of the color-roller and the fabric-support to properly treat fabrics having relief ornamentation of various depth or degree of protuberance.

I regard the opposed relation of the fabric-support and the color-roller and the character of the latter and means for adjusting one of said parts relatively to the other and holding it rigid or immovable in its position of adjustment mainly valuable, the other arrangements and details hereinbefore referred to constituting valuable auxiliaries or accessories to which I do not restrict my invention in its broader aspect, but for which I make special claims in addition to the claims for the generic invention.

In Figs. 1, 6, 7, and 8 of the drawings the views are diagrammatic and do not show the means of adjusting and holding the color-rollers; but it will be understood, of course, that the means for this purpose illustrated in Figs. 3, 4, and 5 or equivalent means are utilized in all the machines shown in the several figures of drawings or other forms of machine embodying my invention.

What I claim is—

1. In apparatus for coloring relief ornamentation on fabric, the combination of a fabric-support, a plain-engraved color-roller arranged opposite thereto, and means for adjusting one of said parts relatively to the other and holding the same rigidly in its position of adjustment.

2. In apparatus for coloring relief ornamentation on fabric, the combination of a fabric-supporting roll, a plain-engraved color-roller arranged opposite thereto, and means for adjusting one of said parts relatively to the other and holding the same rigidly in its position of adjustment.

3. In apparatus for coloring relief ornamentation on fabric, the combination of a fabric-support, a plain-engraved color-roller arranged opposite thereto, and means for adjusting said color-roller relatively to the fabric-support and holding it in its position of adjustment.

4. In apparatus for coloring relief ornamentation on fabric, the combination of a fabric-supporting roll, a plain-engraved color-roller arranged opposite thereto, and means for adjusting said color-roller relatively to the fabric-support and holding it in its position of adjustment.

5. In apparatus for coloring relief ornamentation on fabric, the combination of a fabric-support, a plain-engraved color-roller arranged opposite thereto, and an adjustable carriage carrying one of said parts and holding it rigidly in different positions of adjustment relatively to the other of said parts.

6. In apparatus for coloring relief ornamentation on fabric, the combination of a fabric-support, a plain-engraved color-roller arranged opposite thereto, and an adjustable carriage carrying said roller and holding it rigidly in different positions of adjustment relatively to said support.

7. In apparatus for coloring relief ornamentation on fabric, the combination of a preliminary smoothing-out means, a fabric-support, a plain-engraved color-roller arranged opposite thereto, and an adjustable carriage carrying one of said parts and holding it rigidly in different positions of adjustment relatively to the other of said parts.

8. In apparatus for coloring relief ornamentation on fabric, the combination of a fabric-support, a plain-engraved color-roller arranged opposite thereto, an adjustable carriage carrying one of said parts and holding it rigidly in different positions of adjustment relatively to the other of said parts, and a color-pressing means.

9. In apparatus for coloring relief ornamentation on fabric, the combination of a preliminary smoothing-out means, a fabric-support, a plain-engraved color-roller arranged opposite thereto, an adjustable carriage carrying one of said parts and holding it rigidly in different positions of adjustment relatively to the other of said parts, and color-pressing means.

In testimony whereof I have hereunto set my hand in presence of two subscribing witnesses.

JOSEPH BENNETT.

Witnesses:
DAVID A. RUSSELL,
STEWART F. CARTER.